Nov. 1, 1955 G. A. LYON 2,722,459
WHEEL COVER
Filed Dec. 20, 1951 2 Sheets-Sheet 1
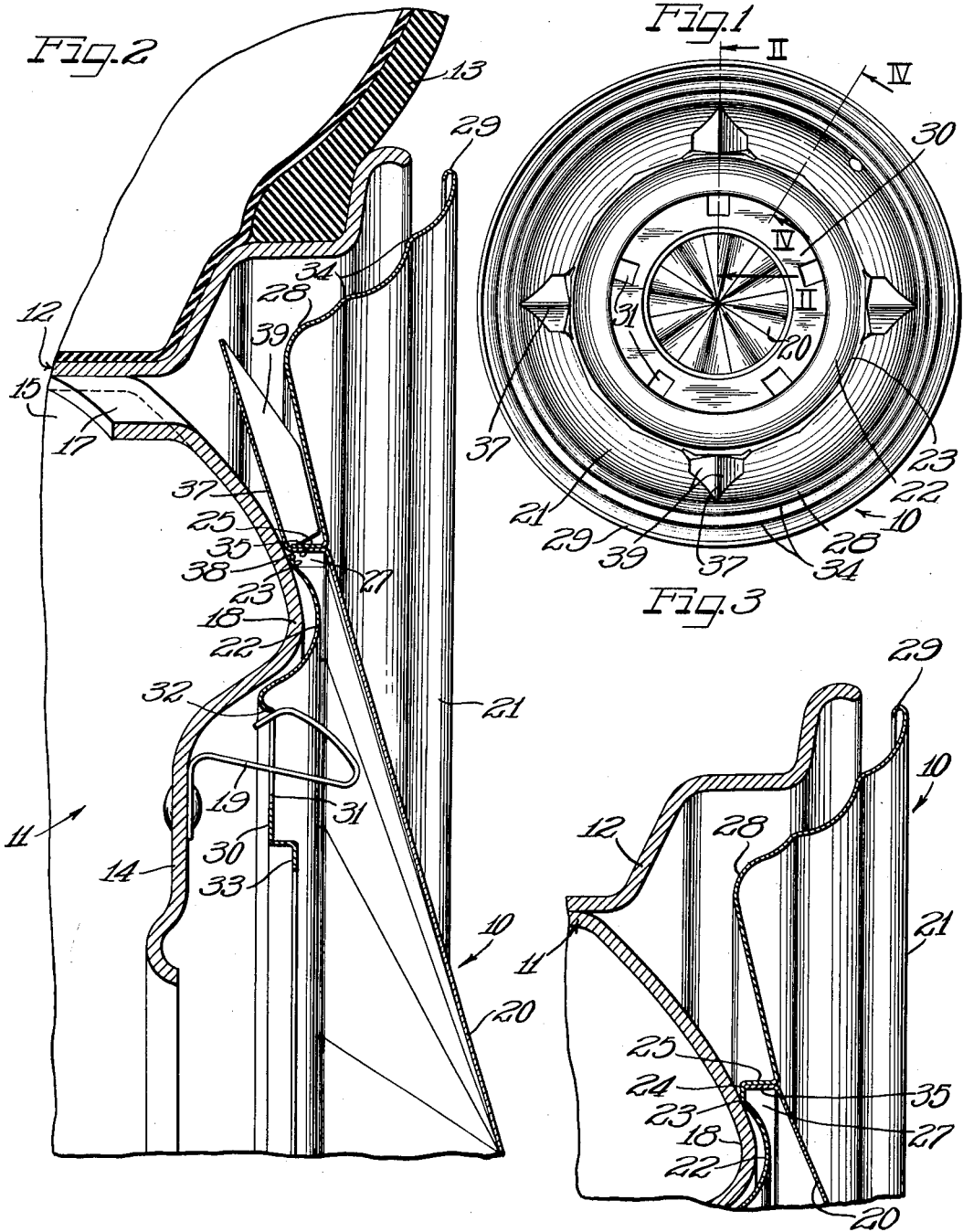
Inventor:
George Albert Lyon Nov. 1, 1955  G. A. LYON  2,722,459
WHEEL COVER
Filed Dec. 20, 1951  2 Sheets-Sheet 2
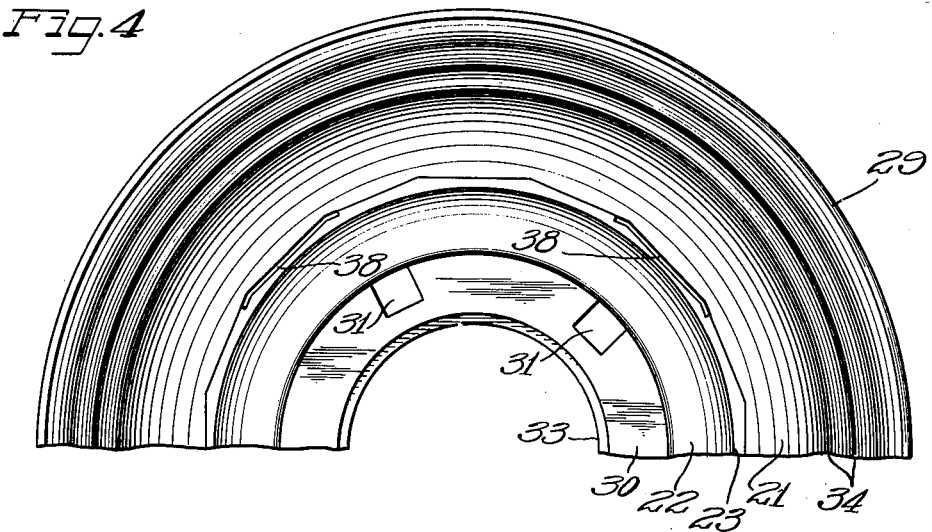
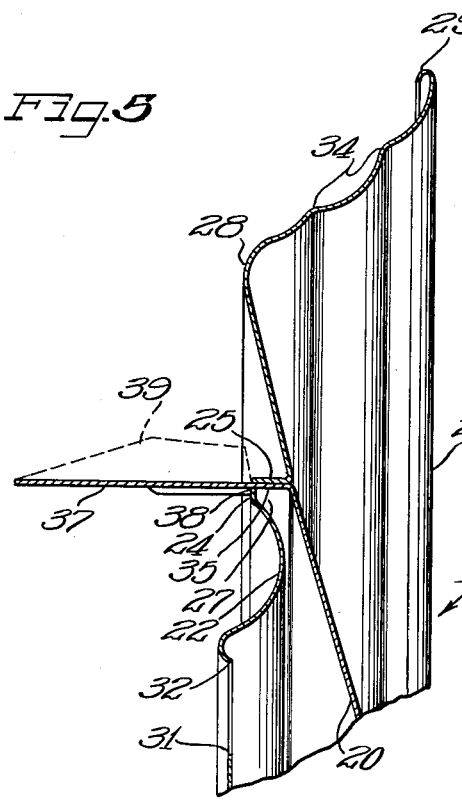
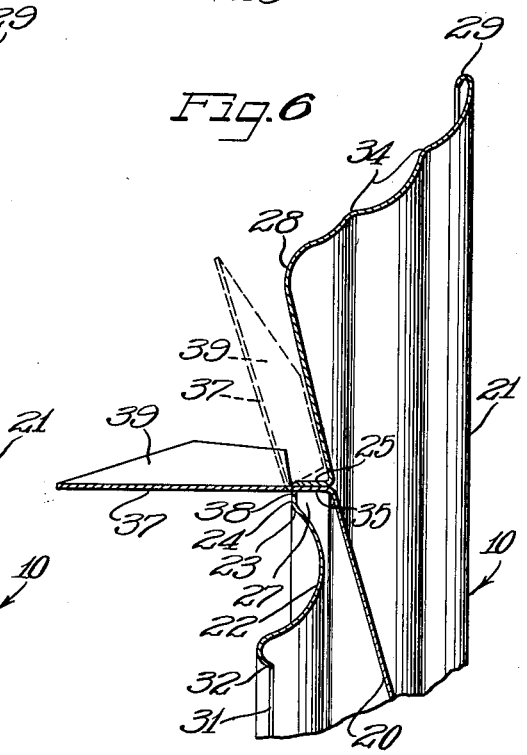
Inventor:
George Albert Lyon

United States Patent Office 2,722,459
Patented Nov. 1, 1955

2,722,459

WHEEL COVER

George Albert Lyon, Detroit, Mich.

Application December 20, 1951, Serial No. 262,583

12 Claims. (Cl. 301—37)

The present invention relates to improvements in wheel structures and more particularly concerns the provision of improved ornamental and protective covering means for the outer sides of vehicle wheels.

An important object of the present invention is to provide a wheel structure including improved cover means for the outer side of the wheel.

Another object of the invention is to provide a wheel structure having a cover thereon including means for promoting air circulation through the wheel.

Another object of the invention is to provide an improved composite vehicle wheel cover.

It is a further object of the invention to provide such a wheel cover including means for promoting air circulation through a vehicle wheel.

According to the general features of the invention there is provided in a wheel structure including a tire rim and a wheel body having air circulation openings therethrough, a cover for the outer side of the wheel including a member retained in position on the wheel and having a portion for substantially covering the tire rim in spaced relation, the cover having a second member attached thereto and including air circulation promoting members behind the first mentioned cover member and extending into the space adjacent the tire rim for promoting movement of air within said space.

According to other features of the invention there is provided in a wheel cover for disposition at the outer side of a vehicle wheel, a pair of cover members, one of which has slots therein, and the other of which has extensions thereon within said slots and retaining the cover members in assembly, said extensions including air circulation promoting vanes behind the cover.

According to additional features of the invention there is provided in a cover for disposition at the outer side of a vehicle wheel, a cover member having a central snap-on pry-off flange for engagement with retaining clips on a vehicle wheel, and means behind the cover comprising vane members for promoting circulation of air through a vehicle wheel.

Other objects, features and advantages of the present invention will be readily apparent from the following detailed description of a preferred embodiment thereof taken in conjunction with the accompanying drawings in which:

Figure 1 is a rear elevational view of a cover embodying the features of the present invention;

Figure 2 is a radial sectional view taken on an enlarged scale and taken substantially on the line II—II of Figure 1 and showing the cover as applied to a vehicle wheel;

Figure 3 is an enlarged radial sectional view through the cover taken substantially on the line IV—IV of Figure 1 and also showing the cover as applied to the wheel;

Figure 4 is a fragmentary rear elevational view of one of the cover members before assembly with the second of the cover members;

Figure 5 is a radial sectional view similar to Figure 2 but showing the cover components in one stage of assembly; and Figure 6 is a radial sectional view similar to Figure 5 and showing the cover components in further stage of assembly.

A cover 10 embodying the features of the invention is adapted to be applied to the outer side of a vehicle wheel including a wheel body 11 and a tire rim 12, the latter being of the multi-flanged drop center type adapted for supporting a pneumatic tire and tube assembly 13.

The wheel body 11 is preferably of the disk type and comprising a stamping made from a suitable gauge sheet metal and having a central bolt on flange 14 and a peripheral attachment flange 15 secured to the base flange of the tire rim. At suitable intervals, the attachment flange 15 of the wheel body is inset to provide wheel openings 17 through which air may circulate for cooling the brake drum of a vehicle with which the wheel may be associated. Intermediate the bolt on flange 14 and the attachment flange 15, the wheel body is formed with an annular generally axially outwardly projecting nose bulge 18. On the bolt on flange 14 is mounted a plurality of generally gooseneck retaining clips 19 having the resilient retaining head portions directed toward the radially inner side of the nose bulge 18.

According to the present invention, the wheel cover 10 comprises a composite structure adapted to be held upon the wheel by means of the clips 19 and also having means for promoting circulation of air through the wheel openings 17. To this end, the cover comprises a central crown member 20 and an annular trim ring and attachment member 21. The crown member 20 is dimensioned to overlie the central portion of the wheel body and the inner marginal portion of the trim ring and retaining member 21. The trim ring and retaining member is dimensioned to substantially overlie the tire rim 12 and to support the outer margin of the crown member 20.

In a preferred form, the annular cover member 21 is constructed to bear against the wheel body 11 at the nose bulge 18. For this purpose, the cover member 21 is provided with an annular generally axially outwardly projecting intermediate rib portion 22 to overlie the nose bulge 18 of the wheel body. At its radially outer side, the rib 22 merges with a generally axially inwardly projecting annular rib 23 which in assembly of the cover with the wheel bears against the radially outer side of the peak portion of the nose bulge 18 of the wheel body as best seen in Figs. 2 and 3. The rib 23 is defined by a preferably flat generally radially extending bottom wall 24 and a radially outer side generally axially outwardly extending wall 25. In this manner the inwardly extending rib 23 defines a generally axially outwardly opening groove 27 intermediately in the annular cover member 21.

From the outer margin of the rib side wall 25, the annular cover member has projecting generally radially outwardly a dished trim ring portion 28 which generally simulates in its cross-sectional form the annular outwardly opening groove defined between the tire rim and the nose bulge of the wheel body. To this end the trim ring portion 28 extends generally radially outwardly and axially inwardly and then generally divergently radially outwardly and axially outwardly to an underturned terminal flange 29 providing a reinforcing bead at the outer edge of the cover. It will be observed that the trim ring portion 28 and the radially inner divergent portion thereof lie in substantial spaced relation opposite the wheel body at least to the extent of the spaced relation provided by the axially extending portion 25 of the trim ring member. The axially outwardly diverging radially outer portion of the trim ring lies in spaced relation to the tire rim. Thereby a substantial air space is provided behind the trim ring portion of the cover communicating with the wheel openings 17. At its outer extremity 29, the trim ring member lies in spaced relation to the terminal flange of the tire rim and thus a substantial gap or peripheral opening to the air space is afforded. Since the extremity of the cover is substantially spaced axially outwardly from the tire rim terminal flange, the air moving along the outer side of the wheel, such as the slipstream as the associated vehicle moves forwardly, will be caught and move into the space behind the cover for circulation through the wheel openings 17 into cooling relation to the brake drum with which the wheel is associated.

Radially inwardly, the intermediate nose bulge clearing hump or rib 22 merges with a generally radially inwardly extending attachment flange 30. This flange projects radially inwardly beyond the clips 19 and has a series of clip apertures 31 through which the clips extend for retaining engagement with a generally axially outwardly extending reinforcing and clip engageable retaining shoulder flange 32 provided at juncture of the rib 22 with the attachment flange 30. At its radial inner edge the attachment flange 30 is reinforced by a generally L-shaped reinforcing flange 33.

In applying the cover to the wheel, the clip apertures 31 are centered with relation to the clips 19, and the cover pressed home so that the heads of the clips will snap into engagement with the retaining shoulder flange 32 and thereby resiliently urge the cover to seat on the wheel body at the seating rib 23 of the cover. Since the clips 19 engage through the apertures 31, the cover is held by the clips against turning on the wheel.

For removing the cover, a pry-off tool is inserted into the gap between the radially outer section of the trim ring portion 28 and pry-off leverage applied to the cover, using the tire rim as a fulcrum. To reinforce the outer wing section of the trim ring portion against pry-off tool damage and also to strengthen the same against curbing or other damage, the outer trim ring portion is provided with a series of corrugations affording annular spaced concentric reinforcing ribs 34.

In a convenient manner of attaching the central crown portion 20 of the cover to the trim ring portion 21, the crown portion is marginally assembled into the groove 27 of the trim ring member of the cover. For this purpose the crown portion 20 is provided with a generally axially inwardly extending flange 35 which is complementary to the axially extending flange 25 of the trim ring member. In the assembly the flanges 25 and 35 are snugly interengaged with the outer surfaces of the crown and of the trim ring member coming together in substantially the same plane. In a preferred form, the walls 25 and 35 are of multi-facet construction, that is provided with a plurality of angularly related substantially flat panels, with the crown member 20 having the crown portion thereof formed with corresponding segments terminating at a common point at the center of the crown, as best seen in Figs. 1 and 2.

Permanent interconnection of the cover members is effected by providing the peripheral wall flange 35 of the crown cover member with a series of extension tabs 37 (Figs. 2, 5 and 6) which extend through respective slots 38 in the base wall 24 of the trim ring member groove (Figs. 4, 5 and 6). By preference the extension tabs 37 are of generally arrowhead shape and in the initial assembly extend straight through the slot 38, as shown in Figs. 5 and 6.

After the initial assembly, the tabs 37 are bent along their longitudinal axis to provide a pair of wings 39, substantially as shown in dash outline Fig. 5 and in full outline in Fig. 6, and the tabs are then bent on a generally transverse line at a fulcrum provided by the inner edge of the wall 25 into generally radially outwardly and axially inwardly directed relation behind the trim ring portion 28 of the cover substantially as indicated in dash outline in Fig. 6 and as shown in full outline in Figs. 1 and 2. Each of the extensions 37 thereby is interlocked against withdrawal from the associated slot 38 by reason of the interengaged relation of the bent over shoulder of the extensions contiguous the inner edge of the cover wall 25, and the backing up against the radially outer side of the wall 25 of the inner end portions of the wings 39.

In the assembly of the cover on the wheel, as seen in Fig. 2, the extensions 37 lie in spaced relation to the radially outer portion of the wheel body and project into the air circulation space behind the cover opposite the wheel openings 17. Since the wings 39 of the extensions diverge generally axially outwardly, the extensions provide vanes which will operate in the turning of the wheel to promote movement of air axially inwardly and thus into and through the wheel openings 17 toward the rear of the wheel for circulation coolingly about and past the brake drum with which the wheel may be associated.

It will be understood that modifications and variations may be effected without departing from the scope of the novel concepts of the present invention.

I claim as my invention:

1. In a wheel structure including a tire rim and a wheel body supporting the tire rim and having openings therethrough adjacent to the tire rim for circulation for air through the wheel, a cover for the outer side of the wheel including respective portions overlying the wheel body and the tire rim, the portion of the cover overlying the wheel body having an annular generally axially inwardly extending rib bottomed against the wheel body, the portion of the cover overlying the tire rim being in spaced relation thereto and affording an air space opening peripherally between the outer margin of the cover and the outer margin of the tire rim, and air circulation promoting means projecting generally radially outwardly into said space from said rib.

2. In a wheel structure including a tire rim and a load sustaining body supporting the tire rim and having openings adjacent the tire rim for circulation of air through the wheel, a cover for the outer side of the wheel comprising a portion lying in spaced relation to the tire rim and affording air space therebehind opening peripherally between the cover margin and the margin of the tire rim, and a portion of the cover bottomed against the wheel body, said portion bottomed against the wheel body having a series of apertures therethrough and carrying a second cover member at the axially outer side thereof, said second cover member having respective extensions projecting through said apertures and angled generally radially outwardly into said space to provide air circulation vanes.

3. In a wheel structure including a tire rim and a wheel body supporting the tire rim and having openings adjacent the tire rim for circulation of air through the wheel, a cover for the outer side of the wheel comprising a ring member bottomed on the wheel body and having an annular generally axially inwardly directed rib engaging the wheel body and affording a generally axially outwardly opening groove in the annular cover member, said annular cover member having a portion extending radially outwardly beyond the groove and lying in spaced relation to the tire rim to afford an air circulation space with the tire rim, and a central cover member having a marginal flange assembled in said groove, said rib having apertures therethrough, said marginal flange having extensions thereon projecting through said apertures and angled generally radially outwardly into said space to provide air circulation promoting vanes.

4. A cover for disposition at the outer side of a vehicle wheel, comprising an annular member having an intermediate generally axially outwardly opening annular groove, and a central crown member having a marginal flange assembled in said groove, said annular cover member having apertures in the bottom of said groove, said flange having pointed extensions projecting through said apertures and interlocked behind said annular cover member whereby the extension points generally radially outwardly and terminates in spaced relation behind said cover member.

5. A cover for disposition at the outer side of a vehicle wheel comprising an annular cover member having an intermediate generally axially outwardly opening annular groove, and a central crown member having a marginal flange assembled in said groove, said annular cover member having apertures in the bottom of said groove, said flange having extensions projecting through said apertures and interlocked behind said annular cover member, said extensions being of substantial length and extending generally radially outwardly behind said annular cover member to afford vane-like elements.

6. A cover for disposition at the outer side of a vehicle wheel comprising an annular member having an intermediate generally axially outwardly opening annular groove, and a central crown member having a marginal flange assembled in said groove, said annular groove member having apertures in the bottom of said groove, said flange having extensions projecting through said apertures and interlocked behind said annular cover member, said extensions being of substantial length and extending generally radially outwardly behind said annular cover member to afford vane-like elements, said vane-like elements being of generally arrow-shape.

7. In a cover for disposition at the outer side of a vehicle wheel, a retaining and trim ring annulus having an inner attachment flange adapted to be engaged by retaining clips on a wheel and a radially outer trim ring portion, said portions having a generally axially inwardly extending annular rib therebetween providing an outwardly opening groove including a bottom wall and a radially outer side wall, and a crown cover member having a marginal flange directed generally axially inwardly and assembled in snug engagement with said groove side wall, said groove bottom wall having apertures therein and said marginal flange having extensions thereon projecting through said apertures and interlocked behind said side wall.

8. In a cover for disposition at the outer side of a vehicle wheel, a retaining and trim ring annulus having an inner attachment flange adapted to be engaged by retaining clips on a wheel and a radially outer trim ring portion, said portions having a generally axially inwardly extending annular rib therebetween providing an outwardly opening groove including a bottom wall and a radially outer side wall, and a crown cover member having a marginal flange directed generally axially inwardly and assembled in snug engagement with said groove side wall, said groove bottom wall having apertures therein and said marginal flange having extensions thereon projecting through said apertures and interlocked behind said side wall, said extensions being of substantial length and projecting generally radially outwardly behind said trim ring portion and having divergent vane wings angled toward said trim ring portion.

9. In a cover for disposition at the outer side of a vehicle wheel, an annular cover member having radially inner attachment means and a radially outer trim ring portion, an annular axially outwardly opening groove at the radial inner side of said trim ring portion, a crown cover member having a marginal portion thereof assembled in said groove, said annular cover member having apertures in said groove, and extensions on the crown cover member projecting through said apertures, said extensions being of substantial length and angled generally radially outwardly behind said trim ring portion, said trim ring portion including a plurality of concentric spaced annular ribs reinforcing the same.

10. In a wheel cover for disposition at the outer side of a vehicle wheel, an annular cover member having an intermediate outwardly projecting annular rib of substantial cross-sectional dimension for overlying a nose bulge of a vehicle wheel body, an annular generally axially inwardly extending rib at the outer side of said outwardly projecting rib, and a crown member having a marginal flange assembled within said axially inwardly projecting rib and including means interlocking the same with said annular cover member.

11. In a wheel cover for disposition at the outer side of a vehicle wheel, an annular cover member having an intermediate outwardly projecting annular rib of substantial cross-sectional dimension for overlying a nose bulge of a vehicle wheel body, an annular generally axially inwardly extending rib at the outer side of said outwardly projecting rib, and a crown member having a marginal flange assembled within said axially inwardly projecting rib and including means interlocking the same with said annular cover member said annular cover member having at the radially inner side of said axially outwardly extending rib an attachment flange projecting radially inwardly and concealed by said crown cover member.

12. In a wheel cover for disposition at the outer side of a vehicle wheel, a first cover member having a slot therethrough, a second cover member having an extension thereon projecting through said slot and extending generally radially behind said first cover member, said extension providing an air circulation promoting vane behind said first cover member having an air motivating surface extending generally radially and axially and facing generally circumferentially.

References Cited in the file of this patent

UNITED STATES PATENTS

| 2,276,405 | Lyon | Mar. 17, 1942 |
| 2,309,519 | Lyon | Jan. 26, 1943 |
| 2,441,008 | Chase | May 4, 1948 |
| 2,633,944 | Butterfield | Apr. 7, 1953 |

FOREIGN PATENTS

| 431,007 | Italy | Feb. 23, 1948 |